US010521658B2

(12) United States Patent
Trail

(10) Patent No.: US 10,521,658 B2
(45) Date of Patent: Dec. 31, 2019

(54) EMBEDDED EYE TRACKER WITH DICHROIC MIRROR

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 50 days.

(21) Appl. No.: 15/644,203

(22) Filed: Jul. 7, 2017

(65) Prior Publication Data

US 2019/0012540 A1 Jan. 10, 2019

(51) Int. Cl.
| | |
|---|---|
| *G06K 9/00* | (2006.01) |
| *G02B 27/01* | (2006.01) |
| *G02B 27/14* | (2006.01) |
| *H04N 5/33* | (2006.01) |
| *G02B 27/30* | (2006.01) |
| *F21V 8/00* | (2006.01) |

(52) U.S. Cl.
CPC ....... *G06K 9/00604* (2013.01); *G02B 6/0081* (2013.01); *G02B 27/0172* (2013.01); *G02B 27/141* (2013.01); *H04N 5/332* (2013.01); *G02B 27/30* (2013.01); *G02B 2027/0178* (2013.01)

(58) Field of Classification Search
CPC .............. G02B 27/017; G02B 27/0172; G02B 27/0178; G02B 27/141; G02B 27/30; G02B 6/0081; G06K 9/00604; H04N 5/332
See application file for complete search history.

(56) References Cited

U.S. PATENT DOCUMENTS

| | | | | | |
|---|---|---|---|---|---|
| 5,856,842 | A | * | 1/1999 | Tedesco ................. | H04N 7/144 348/14.01 |
| RE37,292 | E | * | 7/2001 | Togino ............... | G02B 17/0832 359/630 |
| 6,317,267 | B1 | * | 11/2001 | Takahashi .......... | G02B 17/0816 359/630 |
| 8,289,231 | B2 | * | 10/2012 | Budd ................. | G02B 27/0172 345/7 |

(Continued)

FOREIGN PATENT DOCUMENTS

WO WO-2019010220 A1 * 1/2019 ......... G02B 27/0093

OTHER PUBLICATIONS

PCT International Search Report and Written Opinion, PCT Application No. PCT/US2018/040780, dated Nov. 16, 2018, 16 pages.

*Primary Examiner* — James R Sheleheda
(74) *Attorney, Agent, or Firm* — Fenwick & West LLP

(57) ABSTRACT

An eyewear device has an optical element, a source, a dichroic mirror, and a camera. The optical element has a front surface, a back surface, a rim, and an angled portion of the rim. The source emits light in a first band of light and is configured to illuminate a portion of an eye of a user of the eyewear device. The dichroic mirror is arranged proximate to the angled portion of the rim, is reflective in the first band of light, is transmissive in a second band of light, and is configured to direct light in the first band reflected from the portion of the eye toward a first position. The camera is located in the first position that is located in a plane of the optical element, and the camera is configured to capture images of the light in the first band reflected by the dichroic mirror.

20 Claims, 4 Drawing Sheets

(56) References Cited

U.S. PATENT DOCUMENTS

| | | | |
|---|---|---|---|
| 9,091,851 B2* | 7/2015 | Border | G02B 27/0172 |
| 9,625,723 B2* | 4/2017 | Lou | G02B 27/0172 |
| 9,759,913 B2* | 9/2017 | Saarikko | G02B 6/02085 |
| 9,958,680 B2* | 5/2018 | Liu | G02B 27/0172 |
| 10,056,020 B2* | 8/2018 | Chi | G02B 27/141 |
| 10,180,572 B2* | 1/2019 | Osterhout | G02B 27/0093 |
| 10,204,451 B2* | 2/2019 | Lanier | G06T 19/006 |
| 2008/0030685 A1 | 2/2008 | Fergason et al. | |
| 2008/0094720 A1* | 4/2008 | Yamazaki | G02B 27/017 359/631 |
| 2008/0285140 A1* | 11/2008 | Amitai | G02B 6/0056 359/630 |
| 2013/0077049 A1 | 3/2013 | Bohn | |
| 2013/0201081 A1* | 8/2013 | Evans | G09G 5/02 345/8 |
| 2013/0293448 A1* | 11/2013 | Jannard | G02C 11/06 345/8 |
| 2014/0071539 A1* | 3/2014 | Gao | G02B 27/0025 359/630 |
| 2014/0140654 A1* | 5/2014 | Brown | G02F 1/29 385/10 |
| 2014/0218801 A1* | 8/2014 | Simmonds | G02B 27/1086 359/567 |
| 2014/0361957 A1* | 12/2014 | Hua | G06F 3/013 345/8 |
| 2014/0375789 A1 | 12/2014 | Lou et al. | |
| 2015/0248791 A1* | 9/2015 | Abovitz | G06F 16/7837 345/633 |
| 2016/0292850 A1* | 10/2016 | Perez | G06F 3/005 |
| 2016/0342206 A1 | 11/2016 | Shazly et al. | |
| 2017/0176749 A1 | 6/2017 | Ouderkirk et al. | |
| 2017/0315613 A1* | 11/2017 | Fein | G06T 11/60 |
| 2018/0082644 A1* | 3/2018 | Bohn | G02B 6/003 |
| 2018/0136474 A1* | 5/2018 | Yeoh | G02B 6/0016 |
| 2018/0172995 A1* | 6/2018 | Lee | G02B 27/0172 |
| 2018/0188542 A1* | 7/2018 | Waldern | G06F 3/0433 |
| 2018/0246336 A1* | 8/2018 | Greenberg | G02B 27/0172 |
| 2019/0025587 A1* | 1/2019 | Osterhout | G02B 27/0093 |

\* cited by examiner

US 10,521,658 B2

EMBEDDED EYE TRACKER WITH DICHROIC MIRROR

BACKGROUND

The present disclosure generally relates to an eye tracker, and specifically relates to an eye tracker that can be embedded in a frame of a compact augmented reality (AR) display.

Head mounted devices (HMD) for virtual reality (VR) systems typically have a mirror arranged in between a lens and a display. The mirror directs light reflected from the eye to a camera that is used for eye tracking. Because virtual reality systems have relatively large form factors, and have room between the lens and the display, the mirror can be positioned behind the lens.

Augmented reality systems typically rely on wearable devices that have much smaller form factors than classical VR head mounted devices. For example, augmented reality devices may be near-eye-displays that resemble eyeglasses. In such devices, a mirror cannot be conveniently placed behind a lens. Instead, augmented reality devices often include a camera that images the eye directly. However, to avoid disrupting the view of the user, the camera is typically placed far from the optical axis, e.g., in the frame of the device. This results in a very off-axis view, which hinders accurate tracking of the eye. Furthermore, the camera is exposed, and can easily become dirty, scratched, or damaged.

SUMMARY

A near-eye-display typically includes a frame and an optical element, such as a waveguide display, a lens, or a combination of waveguide display(s) and/or lens(es). To fit an eye tracker into a compact augmented reality (AR) device, an angle can be cut into a portion of the optical element, and a dichroic mirror can be affixed to the angled portion of the optical element. The dichroic mirror reflects the non-visible light to a camera, which can be embedded in the frame of the device, in the same plane of the optical element. The dichroic mirror can reflect non-visible light that is used for eye tracking (e.g., infrared light), and transmit visible light, so that the dichroic mirror is not visible to a wearer. Because the dichroic mirror extends into the optical element, it provides the camera a view of the eye that is more on-axis than if the camera in the frame were to directly image the eye. The near-eye-display can also include one or more light sources to provide the non-visible light that is reflected by the eye, reflected by the dichroic mirror, and then captured by the camera.

More particularly, an eyewear device is described herein. The eyewear device includes an optical element, one or more sources, and a camera. The optical element has a front surface, a back surface, a rim, and an angled portion of the rim. In some embodiments, the optical element is or includes a waveguide display. The one or more sources emit light in a first band of light, and the one or more sources are configured to illuminate a portion of an eye of a user of the eyewear device. The dichroic mirror is arranged proximate to the angled portion of the rim, and the dichroic mirror is reflective in the first band of light, is transmissive in a second band of light, and is configured to direct light in the first band that is reflected from the portion of the eye toward a first position. The camera is located in the first position, and the first position is located in a plane of the optical element. The camera is configured to capture one or more images of the light in the first band reflected by the dichroic mirror. The eyewear device may also include a frame for housing the optical element, the source or sources, and the camera.

Figure 1:
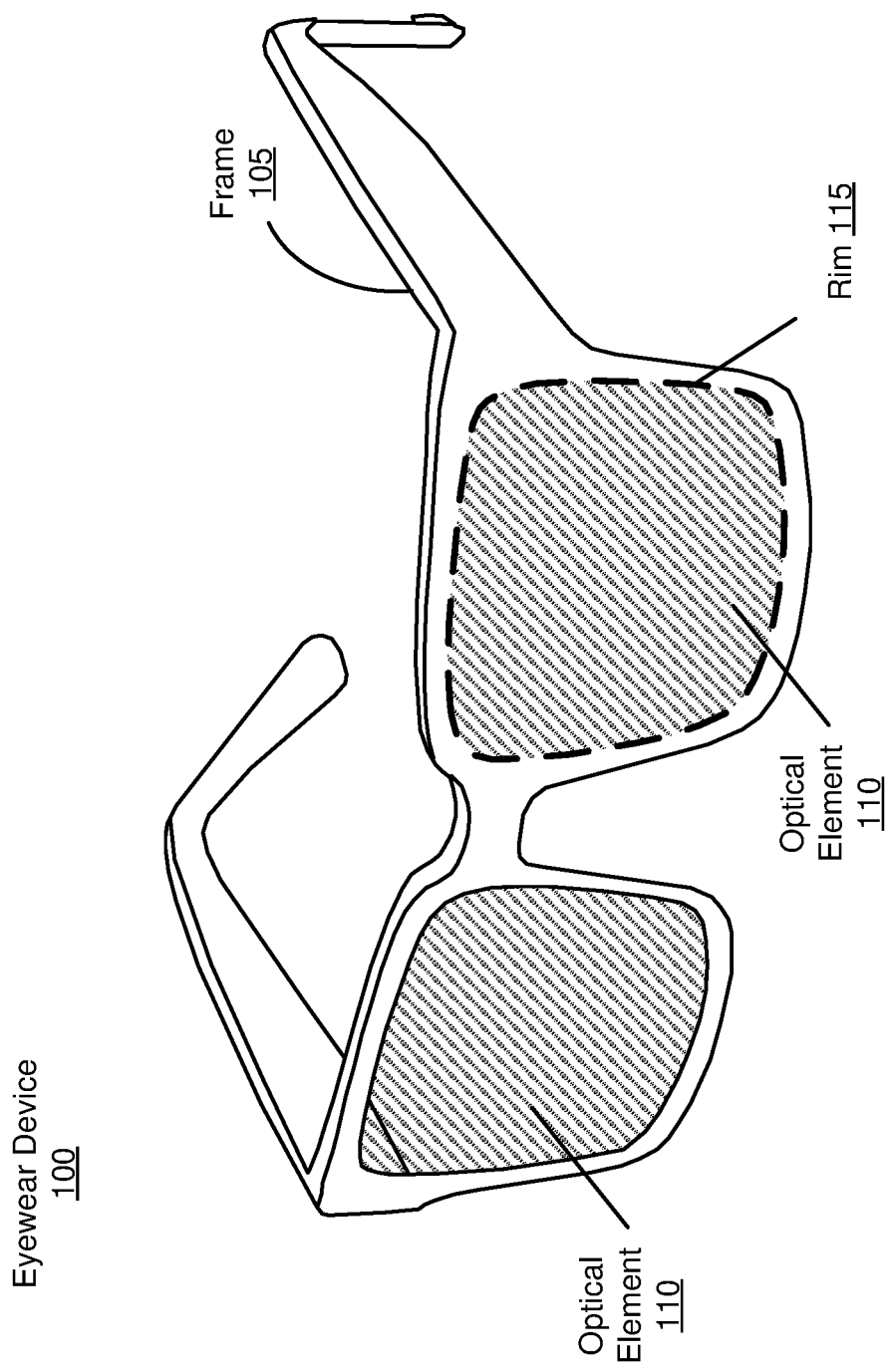
FIG. 1 is a diagram of an eyewear device, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

An eyewear device can incorporate an eye tracking system that includes light sources, a dichroic mirror, and a camera. The eyewear device also includes an optical element, which may include a display or display path element (such as a waveguide display), a lens or lens stack (such as a powered optical element, corrective lens, or a UV lens), or a combination of displays and/or lenses. While the eyewear device can either track one or both eyes of a user, for convenience, a single eye tracking system for tracking one eye is described herein. A second eye tracking system may be included for the other eye, or multiple tracking systems may be included for each eye. For example multiple eye tracking systems may be included in a stereo configuration, or to cover different regions of the eyebox.

The eye tracking system includes one or more light sources for illuminating the eye. The light sources may emit, for example, infrared light. The light reflected from the eye is then reflected by a dichroic mirror that is coupled to the optical element of the eyewear device. The dichroic mirror reflects the light that was emitted by the light sources; for example, if the light sources emit light in the infrared band, the dichroic mirror reflects light in the infrared band. The dichroic mirror is angled relative to the optical element, so that it reflects the light from the eye towards a direction that is roughly perpendicular to the optical axis and roughly parallel to the plane of the optical element. A camera is positioned in the direction in which the light is reflected to capture images of light that is reflected first off the eye, and then off of the dichroic mirror. The images captured by the camera can be analyzed to track the eye. In some embodiments, the eye tracking system further includes a collimator between the dichroic mirror and the camera to collimate the light and direct it to the camera.

Part of the eye tracking system, including the camera, can be positioned in the same plane as the optical element and embedded in the frame of the eyewear device. The camera in the plane of the optical element may be directed straight into the plane of the optical element, or the camera may be tilted within the frame and still considered to be in the plane of the optical element. By positioning the camera in the frame, it does not obstruct the view of a user or distract the viewer, and it is protected by the frame and the optical element. Another part of the eye tracking system, including the dichroic mirror, can extend into beyond the frame and into the optical element. Positioning the dichroic mirror at least partially in the area of the optical element provides the camera a view of the eye that is more on-axis than if a camera embedded in the frame directly imaged the eye. By using a dichroic mirror that reflects some light (e.g., infrared light) but allows transmission of most or all visible light, the dichroic mirror does not obstruct the view of the user.

FIG. 1 is a diagram of an eyewear device 100, in accordance with an embodiment. In some embodiments, the eyewear device 100 is a near-eye-display for presenting media to a user. Examples of media presented by the eyewear device 100 include one or more images, text, video, audio, or some combination thereof. In some embodiments, audio is presented via an external device (e.g., speakers and/or headphones) that receives audio information from the eyewear device 100, a console (not shown), or both, and presents audio data based on the audio information. The eyewear device 100 can be configured to operate as a virtual reality (VR) near-eye-display (NED), an augmented reality (AR) NED, a mixed reality (MR) NED, or some combination thereof. For example, in some embodiments, the eyewear device 100 may augment views of a physical, real-world environment with computer-generated elements (e.g., images, video, sound, etc.).

In other embodiments, the eyewear device 100 does not present media or information to a user. For example, the eyewear device 100 may be used in conjunction with a separate display. In other embodiments, the eyewear device 100 may be used for various research purposes, training applications, biometrics applications (e.g., fatigue or stress detection), automotive applications, communications systems for the disabled, or any other application in which eye tracking can be used.

The eyewear device 100 shown in FIG. 1 includes a frame 105 and an optical element 110, which is surrounded by a rim 115. The frame 105 is coupled to one or more optical elements. In some embodiments, the frame 105 may represent a frame of eye-wear glasses. The optical element 110 may be configured for users to see content presented by the eyewear device 100. For example, the eyewear device 110 can include at least one waveguide display assembly (not shown) for directing one or more image light to an eye of the user. A waveguide display assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., are each sources are of different colors. A varifocal waveguide display is a display that can adjust a focal position of image light emitted from the waveguide display. In some embodiments, a waveguide display assembly may include a combination of one or more monochromatic waveguide displays (i.e., a monochromatic waveguide display or a stacked, polychromatic waveguide display) and a varifocal waveguide display. Waveguide displays are described in detail in U.S. patent application Ser. No. 15/495,373, incorporated herein by references in its entirety.

In some embodiments, the optical element 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical element 110 may include one or more additional layers or coatings, such as protective coatings, or coatings for providing any of the aforementioned lens functions. In some embodiments, the optical element 110 may include a combination of one or more waveguide display assemblies, one or more lenses, and/or one or more other layers or coatings.

The rim 115 is an outer portion of the optical element 110 that is in contact with the frame 105. The rim 115 forms the edge of the optical element and can be surrounded by or housed in the frame 105. As discussed below in conjunction with FIG. 3, a portion of the rim of the optical element 110 is cut away so that the dichroic mirror and other elements of an eye tracker (not shown) can be fit into the optical element 110. The portion of the rim (and a corresponding area of the optical element 110 near the rim) to which the dichroic mirror is attached can be at corner of the optical element 110 or along the side of an optical element.

Figure 2:
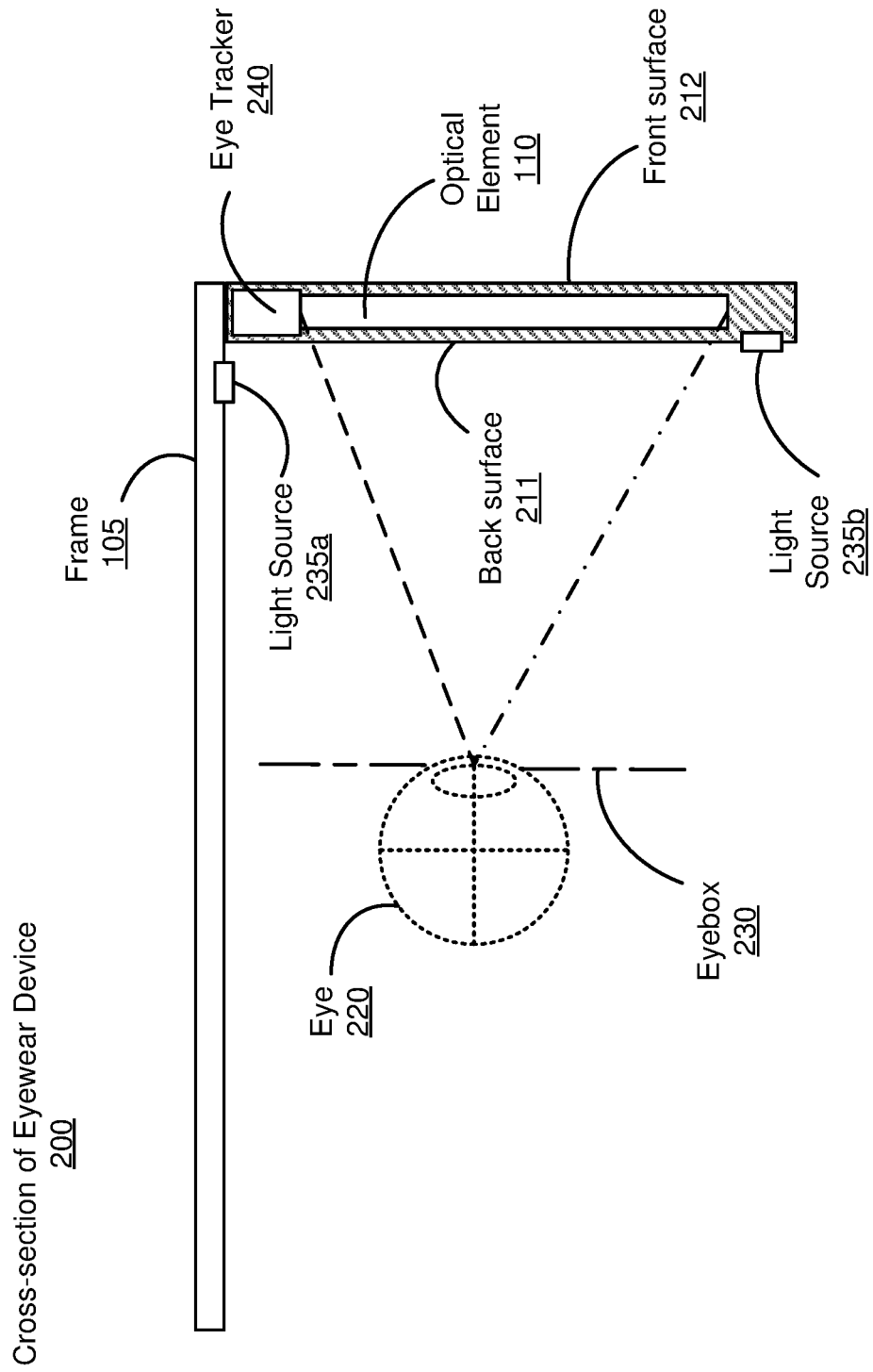
FIG. 2 is a cross section of the eyewear device of FIG. 1, in accordance with an embodiment.

FIG. 2 is a cross-section 200 of the eyewear device 100 illustrated in FIG. 1, in accordance with an embodiment. The optical element 110 is housed in the frame 105, which is shaded in the section surrounded the optical element 110. The optical element 110 has a back surface 211, which faces inward relative to the user, and a front surface 212, which faces outward relative to a user. A user's eye 220 is shown, with dotted lines leading out of the pupil of the eye 220 and extending outward to show the eye's field of vision. An eyebox 230 shows a location where the eye 220 is positioned if the user wears the eyewear device 100. The eyewear device 100 includes an eye tracking system. The eye tracking system includes one or more light sources (e.g., a first light source 235a, a second light source 235b) and an eye tracker 240. For purposes of illustration, FIG. 2 shows the cross section 200 associated with a single eye 220, a single optical element 110, and a single eye tracking system, but in some embodiments, another optical element 210 and another eye tracking system (including another first light source 235a, another second light source 235b, and another eye tracker 240) can be included for another eye 220 of the user. Moreover, in some embodiments the eyewear device 100 may include additional light sources and/or eye trackers for one or both eyes.

The eye tracking system determines eye tracking information for the user's eye 220. The determined eye tracking information may comprise information about a position of the user's eye 220 in an eyebox 230, e.g., information about an angle of an eye-gaze. An eyebox represents a three-dimensional volume at an output of a display in which the user's eye is located to receive image light.

As mentioned above, the eye tracking system includes one or more light sources, such as the light source 235a and the light source 235b, and the eye tracker 240. The light source 235a and the light source 235b are configured to emit light at a particular wavelength or within a particular band of wavelengths. For example, light source 235a and light source 235b may be configured to emit light in the infrared band (~750 nm to 1700 nm), in a visible band (~380 nm to 750 nm), in the ultraviolet band (300 nm to 380 nm), or some other portion of the electromagnetic spectrum. The light source 235a and the light source 235b may be configured to emit light in a sub-division of a band, e.g., in the near-infrared band, the short-wavelength infrared band, or a particular color of visible light, or at a particular wavelength. The light source 235a and 235b may be, for example, laser diodes (e.g., edge emitters), inorganic or organic LEDs, vertical-cavity surface-emitting lasers (VCSELs), or some other source. In some embodiments, one or more of the light sources may emit structured light. Structured light is light that can be used to determine depth information by allowing the correspondence between the light source, angular position on the object, and the camera position. Structured light may include, e.g., a pattern of dots, a pattern of lines, a patterns of sinusoids, some other light that can be used to determine depth information, or some combination thereof.

A single light source or multiple light sources may be included. The light source(s) may be positioned outside of the user's typical line of sight. For example, the light source(s) may be embedded in the frame 105, as shown in FIG. 2. Using multiple light sources may provide more illumination than a single light source. Further, using multiple light sources may provide better coverage of the eyebox 230. Using multiple light sources may help ensure that the eye tracker 240 can receive a good view of the eye under a range of conditions, e.g., for users with different facial geometries, or throughout a range of potential eye directions. In the example shown in FIG. 2, a first light source 235a is attached near the front of the frame and illuminates the eye 220 from an upper corner. A second light source 235b is attached to the lower frame and illuminates the eye 220 from below. In some embodiments, additional light sources may be included elsewhere on the frame 105.

The light source 235a and/or light source 235b may be coupled to a grating or another mechanism for scattering the light emitted by the light source so that it covers the emitted light covers the eyebox 230 or a substantial portion of the eyebox 230. In some embodiments, if the optical element 110 includes a waveguide assembly, the light source (e.g., light source 235b) may be configured to emit light into the waveguide assembly. The waveguide assembly can include diffraction gratings which can scatter the light from the light source into the eyebox 230. This arrangement provides good coverage of the eyebox 230. The waveguide assembly may be a waveguide display assembly, as described above with respect to FIG. 1, or it may be a non-displaying waveguide assembly.

Using multiple light sources or a distributed light source (such as a grating or waveguide) can also help ensure that light reaches the eyebox 230 even if one or more light sources, or an area of a light source, is broken or are fully or partially blocked, e.g., by dirt, a user's hair, or a user's facial geometry. For example, if the eyewear device 100 sits very tightly to a particular user's face, the user's cheek may rest against the bottom of the frame 105 and block the light emitted from the lower light source 235b. However, light emitted by the upper light source 235a may still reach the user's eyebox 230, thus allowing operation of the eye tracker 240.

The eye tracker 240 receives light that is emitted from the light source 235a and/or light source 235b and reflected off of the eye 220. The eye tracker 240 captures images of the received light, and the eye tracker 240 or an external controller analyze the captured images to measure a point of gaze of the user (i.e., an eye position), the motion of the eye 220 of the user (i.e., eye movement), or both. The one embodiment, the eye tracking system determines depth information for the eye 220 based in part on locations of reflections of the light sources 235a, 235b in the captured images of the eye 220. In another embodiment, the user's eye 220 is illuminated with a structured light pattern. Then, the eye tracking system can use locations of the reflected structured light pattern in a captured image to determine eye position and eye-gaze. Additional discussion regarding how the eye tracker 240 determines depth information is found in, e.g., U.S. application Ser. No. 15/456,383 and U.S. application Ser. No. 15/335,634, both of which are hereby incorporated by reference.

The eye tracker 240 includes at least a mirror for reflecting light that is reflected off of the eye 220 and a camera for capturing the light reflected by the mirror. The mirror may be configured to reflect the light in a band of wavelengths that includes at least one wavelength at which light is emitted from the light source 235a and/or light source 235b. In other embodiments, if emitted light is scattered in a way that changes some feature of the light (e.g., wavelength, polarization), or if some feature is otherwise modified after it is emitted by the light source 235a and/or light source 235b, the mirror may be configured to reflect this modified light.

As shown in FIG. 2, the eye tracker 240 is embedded into the frame 105. The mirror of the eye tracker 240 may extend into the optical element 110. The relationship between the mirror and the optical element 110 is described further with respect to FIG. 3. In some embodiments, the eye tracker 240 is hidden from view of the eye 220. In some embodiments, the eye 220 may be able to view at least part of the eye tracker 240, but by locating the eye tracker 240 in or near the frame 105, the eye tracker 240 does not obstruct the vision of the user, and may be less distracting than if the eye tracker 240 were closer to the optical axis.

As shown in FIG. 2, the eye tracker 240 can be embedded in an upper portion of the frame 105. However, the eye tracker 240 can be located in any portion of the frame, e.g., at the bottom, at an outer side, at an inner side, or in a corner. While only one eye tracker 240 is shown in FIG. 2, the eyewear device 100 may include multiple eye trackers 240 per eye 220. For example, different eye trackers 240 may be embedded in different parts of the frame 105. Using multiple eye trackers 240 per eye 220 may increase the accuracy of the eye tracking, and provides redundancy in case an eye tracker 240 or a component of the eye tracker 240 breaks, becomes dirty, is blocked, or otherwise has diminished functionality.

Figure 3:
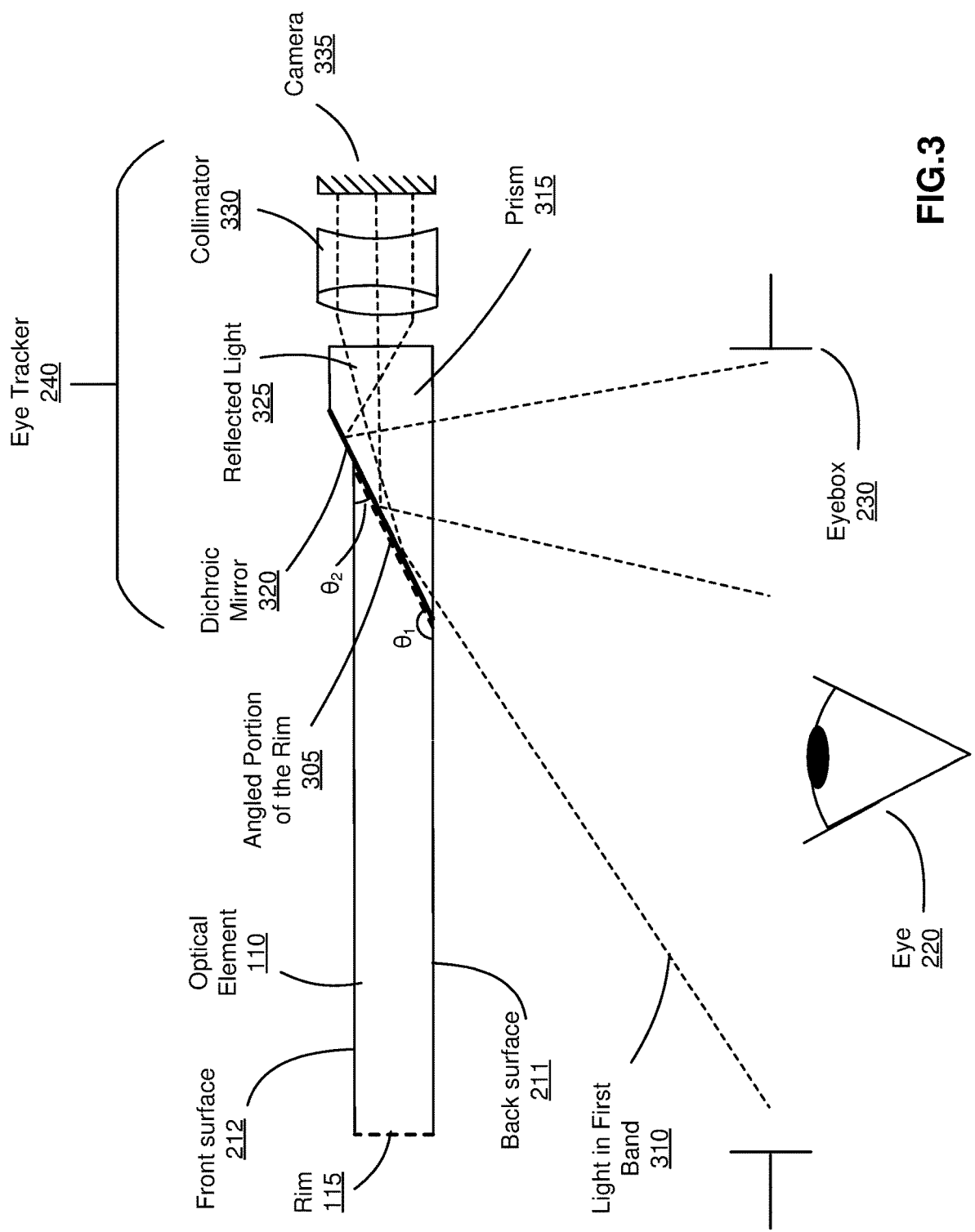
FIG. 3 is a cross section of an optical element and an eye tracker with dichroic mirror for use in an eyewear device, in accordance with an embodiment.

FIG. 3 is a cross section of the optical element 110 and the eye tracker 240 with a dichroic mirror 320 for use in an eyewear device (e.g., the eyewear device 100), in accordance with an embodiment. The eye tracker 240 includes a prism 315, the dichroic mirror 320, a collimator 330, and a camera 335. FIG. 3 also shows how the eye tracker 240 is fitted to the optical element 110. In particular, FIG. 3 shows a cross section of the optical element 110, which is bounded by the back surface 211, the front surface 212, and the rim 115. The rim 115 extends around the edge of the optical element 110. The rim 115 includes an angled portion of the rim 305 at the right side of the optical element 110 (both drawn as dashed lines) in FIG. 3. This angled portion 305 of the rim 115 is considered an angled portion of the rim 305 because it is angled relative to the back surface 211 and the front surface 212. The eye tracker 240 is fitted against the angled portion of the rim 305, which abuts the dichroic mirror 320. The angled portion of the rim 305 extends into and/or out of the page. For example, if the optical element 110 is roughly rectangular, the angled portion of the rim 305 may be along one of the sides of the optical element 110. In some embodiments, the angled portion of the rim 305 may only extend for a portion of the side of the optical element 110. In other embodiments, the angled portion of the rim 305 may be along a corner of the optical element 110.

As discussed above with respect to FIG. 1, the optical element 110 may include a combination of one or more waveguide display assemblies, one or more lenses, and/or one or more other layers or coatings. After the optical element 110 is produced, a portion of the optical element 110 (and the rim 105) may be modified (e.g., cut off) to form the angled portion of the rim 305. Alternatively, the optical element 110 may be produced in the final shape necessary for the product, with the angled portion of the rim 305. The eye tracker 240 is fitted to the angled portion of the rim 305. In some embodiments, the angled portion of the rim 305 may not cut through the entire optical element 110 from the front surface 212 to the back surface 211, and may instead cut through a portion of the optical element 110. For example, if the optical element 110 is made up of several layers (e.g., a waveguide display surrounded by two protective layers), the angled portion 305 may only cut through a portion of the layers (e.g., the angled portion 305 may cut through the waveguide display, but not through the protective layers). In some embodiments, additional layers may be added to the optical element 110 after the angled portion 305 has been cut, or additional layers may be added to the optical element 110 after the angled portion 305 has been cut and the eye tracker 240 (or some component(s) of the eye tracker) has been affixed to the optical element 110.

The angle between the angled portion of the rim 305 and the back surface 211 is labelled $\theta_1$, and the angle between the angled portion of the rim 305 and the front surface 212 is labelled $\theta_2$. $\theta_1$ is an obtuse angle, and $\theta_2$ is an acute angle that is smaller than $\theta_1$. In some embodiments, including the embodiment shown in FIG. 3, $\theta_2$ is less than 45 degrees, and $\theta_1$ is greater than 135 degrees. The angled portion of the rim 305 is angled to reflect light from the eyebox 230 towards the collimator 330 and camera 335.

The eye tracker 240 includes a prism 315, a dichroic mirror 320, a collimator 330, and a camera 335. Light in a first band 310 may be supplied by a light source, such as light source 235a and light source 235b of FIG. 2 (not shown in FIG. 3). The light in the first band 310 is reflected or scattered by the eye 220 and surrounding area in the eyebox 230, travels through the prism 315, and reaches the dichroic mirror 320. The dichroic mirror 320 reflects the light in the first band as reflected light 325, which travels through the collimator 330 for collimating the reflected light 325, and then travels to the camera 335, which captures images of the reflected light 325.

The light in the first band 310 and the reflected light 325 pass through a prism 315, which is a block of material that is at least partially transparent. The prism 315 can be made from any media that is transparent to the light in the first band 310 and the reflected light 325, including glass, ceramics, polymers, or plastic, and the prism 315 can have any index of refraction. The prism 315 may also be transparent to additional wavelengths; for example the prism 315 may be transparent to visible light so that it does not obstruct the view of the user. In some embodiments, the prism 315 may refract the light in the first band 310 (not shown in FIG. 3) as it passes into the prism 315.

In some embodiments, the prism 315 can be curved to adjust optical power. For example, the side of the prism 315 corresponding to the angled portion of the rim 305 can be curved. The angled portion of the rim 305 and the dichroic mirror 320 may be correspondingly curved to fit to the prism 315. Alternatively, there may be a gap between the dichroic mirror 320 and the prism 315. Curving the prism 315 in this way causes it to act similar to a rear-view mirror insert by adding power and increasing the potential field of view for the camera 335. Alternatively, or in addition, the back surface of the prism 315 that is closest to the collimator 330 can be curved. Curving this back surface would help to focus the light towards the camera 335. In some embodiments, an additional optical element is bonded to the prism 315 at that back surface closest to the collimator 330. This additional optical element may be flat or curved, spherical or aspherical. The collimator 330 can be a single lens, a doublet lens (as shown in FIG. 3), or a series of lenses (singlet and/or doublet).

The dichroic mirror 320 is on one side of the prism 315 and is positioned at an angle to reflect light from the eye 220 towards the direction of the camera 335. The dichroic mirror 320 reflects light in a first band, and transmits light in a different band. For example, the dichroic mirror 320 may reflect light in the infrared band and transmit light in the visible band. Alternatively, the dichroic mirror 320 may reflect light of one range of colors in the visible band and transmit light of the other colors in the visible band. FIG. 3 shows in dashed lines several exemplary paths of incoming light in the first band 310 that are reflected by the dichroic mirror 320 as reflected light 325.

The dichroic mirror 320 is attached to the angled portion of the rim 305, the prism 315, or both the angled portion of the rim 305 and the prism 315. For example, the dichroic mirror 320 may be glued or otherwise affixed to the angled portion of the rim 305. Alternatively, the angled portion of the rim 305 may be coated in a dichroic material to create the dichroic mirror 320. As used herein, a dichroic material refers to any material that can be added to a substrate, such as the angled portion of the rim 305, to achieve the desired reflection and transmission properties. The prism 315 can then be fitted to the angled portion of the rim 305 with the dichroic mirror 320. For example, the dichroic mirror 320 may be glued or otherwise affixed to the prism 315. In other embodiments, a side of the prism 315 may be coated in a dichroic material to create the dichroic mirror 320, which is then affixed to the angled portion of the rim 305.

Each of the angled portion of the rim 305, the prism 315, and the dichroic mirror 320 may be flat or some curved surface that is spherical or aspherical, and symmetric or asymmetric. One or more of the angled portion of the rim 305, the prism 315, and the dichroic mirror 320 may have the same curvature, e.g., if the dichroic mirror 320 is formed by coating the angled portion of the rim 305 or the prism 315. The angled portion of the rim 305, the prism 315, and the dichroic mirror 320 may be designed in coordination with each other so that they all fit together. For example, as shown in FIG. 3, the angled portion of the rim 305, the dichroic mirror 320, and the side of the prism 315 abutting the dichroic mirror 320 are all flat. In other embodiments, the angled portion of the rim 305 may be curved, and the dichroic mirror 320 and, in some cases, the prism 315 have a corresponding curve. The surface of the prism 315 may be made curved by attaching a curved lens to a flat surface of the prism 315. In one example, the angled portion of the rim 305 and the dichroic mirror 320 are both concave. In particular, the concave dichroic mirror can be concave with respect to the prism 315 and convex with respect to the optical element 110. Using a concave mirror as dichroic mirror 320 may provide a wider view of the eyebox 230. In some embodiments, the angled portion of the rim 305 and the prism 315 do not fit together, and are separated by a gap. The dichroic mirror 320 may be on either side of that gap, depending on whether the dichroic mirror 320 is affixed to the angled portion of the rim 305 or the prism 315. As one example, the surface of the prism 315 nearest to the angled portion of the rim 305 can be flat, while the angled portion of the rim 305 and the dichroic mirror 320 are curved.

In the embodiment shown in FIG. 3, the prism 315 and the dichroic mirror 320 extend beyond the front surface 212 of the optical element 110. In some embodiments, the form factor of the eye tracker 240 may be larger than the width of the optical element 110, and thus extend in one direction beyond the optical element 110 (e.g., beyond the front surface 212 or beyond the back surface 211), or extend in both directions beyond the optical element 110. In such embodiments, the areas of the eye tracker 240 that extend beyond the optical element 110 may be encased in the frame 105 and hidden to the user. In other embodiments, the eye tracker 240 may be roughly the same width as the optical element 110, so that the prism 315 and dichroic mirror 320 do not extend beyond the front surface 212 of the optical element 110. In still other embodiments, the eye tracker 240 may be thinner than the optical element 110.

The reflected light 325 reflected off the dichroic mirror 320 passes through the prism 315 and into a collimator 330. The collimator 330 includes one or more optical elements (e.g., lenses) that collimate the reflected light 325 and direct the collimated light toward the camera 335. In some embodiments, the collimator 330 may not fully collimate the reflected light 325, and instead performs a pseudo-collimation (e.g., light is slightly diverging or converging) and directs the pseudo-collimated light to the camera 335. In some embodiments, the eye tracker 240 may not include a collimator 330, or may include additional or alternative optical equipment for focusing, polarizing, filtering, diffracting or otherwise adjusting the reflected light 325 before it is captured by the camera 335. The collimator 330 may be affixed to the prism 315 with glue or any other mechanism. Alternatively, the collimator 330 may be configured in a housing (e.g., a part of the frame 105) that holds the collimator 330 in a fixed position within the eye tracker 240.

The camera 335 is positioned behind the collimator 330 and captures the reflected light 325 that has passed through the collimator 330. The camera 335 may be affixed to the collimator 330, or the collimator 330 may be incorporated in the camera 335. Alternatively, the camera 335 may be configured in a housing (e.g., a part of the frame 105) that holds the camera 335 in a fixed position within the eye tracker 240 relative to the collimator 330, prism 315, dichroic mirror 320, and/or optical element 110. The camera 335 may be housed within the frame 105 (not shown in FIG. 3), so that the camera 335 is outside a line of sight of the user. Other elements of the eye tracker 240, such as the collimator 330 and/or a portion of the prism 315 and dichroic mirror 320, may also be housed in the frame 105 and outside the line of sight of the user.

By embedding the eye tracker 240 into the frame 105 and the optical element 110, the only exposed part of the eye tracker 240 is the prism 315. This protects the camera 335 and other elements (e.g., the collimator and the dichroic mirror) from dirt, wear, scratching, rain, or other risks. The prism 315 may be cleaned more simply than an exposed camera. For example, the prism 315, which is flush with the back surface 211, could be cleaned if the user wipes off or cleans the optical element 110. In addition, a protective coating can be applied to the prism 315 to help protect it.

The camera 335 may be a video camera or may capture still images of the eye. The camera 335 is in communication with a controller that is configured to receive one or more images captured by the camera 335 and analyze the one or more captured images to determine eye tracking information of the user of the eyewear device. The controller may be located within the eyewear device 100 as part of the eye tracker 240. In other embodiments, the camera 335 is in communication with an external controller for performing eye tracking.

Figure 4:
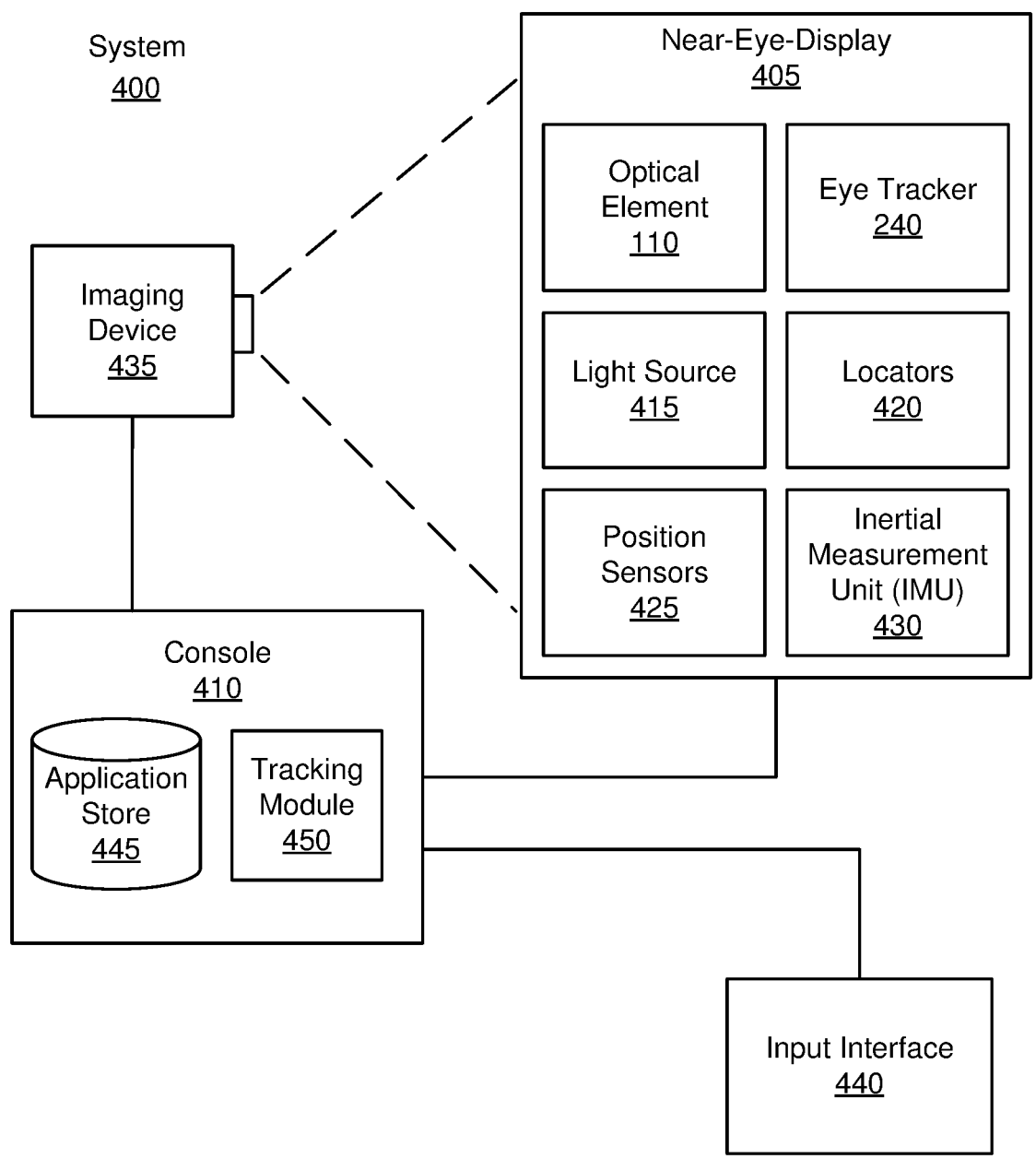
FIG. 4 is a block diagram of a near-eye-display system with an eye tracker, in accordance with an embodiment.

FIG. 4 is a block diagram of a near-eye-display system with an eye tracker, in accordance with an embodiment. The system 400 shown by FIG. 4 comprises a near-eye-display 405, an imaging device 435, and an input interface 440 that are each coupled to the console 410. While FIG. 4 shows an example system 400 including one near-eye-display 405, one imaging device 435, and one input interface 440, in other embodiments any number of these components may be included in the system 400. For example, there may be multiple near-eye-displays 405 each having an associated input interface 440 and being monitored by one or more imaging devices 435, with each near-eye-display 405, input interface 440, and imaging devices 435 communicating with the console 410. In alternative configurations, different and/or additional components may be included in the system 400. Similarly, functionality of one or more of the components can be distributed among the components in a different manner than is described here. For example, some or all of the functionality of the console 410 may be contained within the near-eye-display 405. The system 400 may operate in a VR system environment, an AR system environment, a MR system environment, or some combination thereof.

The near-eye-display 405 presents content to a user. In some embodiments, the near-eye-display 405 is the eyewear device 100. Examples of content presented by the near-eye-display 405 include one or more images, video, audio, text, or some combination thereof. In some embodiments, audio is presented via an external device (e.g., speakers and/or headphones) that receives audio information from the near-eye-display 405, the console 410, or both, and presents audio data based on the audio information. In some embodiments, the near-eye-display 405 may present VR, AR, MR, or some combination thereof to a user. In the AR and/or MR embodiments, the near-eye-display 405 may augment views of a physical, real-world environment with computer-generated elements (e.g., images, video, sound, etc.).

The near-eye-display 405 includes an optical element 110 for each eye, an eye tracker 240, one or more light sources 415, one or more locators 420, one or more position sensors 425, and an inertial measurement unit (IMU) 430. Some embodiments of the near-eye-display 405 have different components than those described here. Similarly, the functions can be distributed among other components in the system 400 in a different manner than is described here. In some embodiments, the optical element 110 displays images to the user in accordance with data received from the console 410.

The eye tracker 240 tracks a user's eye movement. The eye tracker 240 includes at least a dichroic mirror, for reflecting light from an eye area towards a first position, and a camera at the position at which the light is reflected for capturing images. Examples of the eye tracker 240 and the components of the eye tracker 240 are described with respect to FIGS. 2 and 3. Based on the detected eye movement, the eye tracking unit may communicate with the console 410 for further processing.

In some embodiments, the eye tracker 240 allows a user to interact with content presented to the user by the console 410 based on the detected eye movement. Example interactions by the user with presented content include: selecting a portion of content presented by the console 410 (e.g., selecting an object presented to the user), movement of a cursor or a pointer presented by the console 410, navigating through content presented by the console 410, presenting content to the user based on a gaze location of the user, or any other suitable interaction with content presented to the user.

In some embodiments, near-eye-display 405, alone or conjunction with the console 410 or another device, can be configured to utilize the eye tracking information obtained from the eye tracker 240 for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking unit, a controller (e.g., in the console 410) determines resolution of the content provided to the near-eye-display 405 for presentation to the user on the optical element 110. The optical element 110 provides the content to the user having a maximum pixel density (maximum resolution) in a foveal region of the user's gaze, whereas the optical element 110 provides a lower pixel resolution in other regions of the optical element 110, thus achieving less power consumption at the near-eye-device 405 and saving computing cycles of the console 410 and/or near-eye-device 405 without compromising a visual experience of the user.

The light source 415 projects light onto a user's eye or a portion of the user's eye. The light source 415 may include one or more light sources as described above with regard to FIG. 2. The light source 415 is a source of the light that is reflected off of the eye and captured by the eye tracker 240.

The locators 420 are objects located in specific positions on the near-eye-display 405 relative to one another and relative to a specific reference point on the near-eye-display 405. A locator 420 may be a light emitting diode (LED), a corner cube reflector, a reflective marker, a type of light source that contrasts with an environment in which the near-eye-display 405 operates, or some combination thereof. In embodiments where the locators 420 are active (i.e., an LED or other type of light emitting device), the locators 420 may emit light in the visible band (~380 nm to 750 nm), in the infrared (IR) band (~750 nm to 1700 nm), in the ultraviolet band (300 nm to 380 nm), some other portion of the electromagnetic spectrum, or some combination thereof.

In some embodiments, the locators 420 are located beneath an outer surface of the near-eye-display 405, which is transparent to the wavelengths of light emitted or reflected by the locators 420 or is thin enough not to substantially attenuate the wavelengths of light emitted or reflected by the locators 420. Additionally, in some embodiments, the outer surface or other portions of the near-eye-display 405 are opaque in the visible band of wavelengths of light. Thus, the locators 420 may emit light in the IR band under an outer surface that is transparent in the IR band but opaque in the visible band.

The IMU 430 is an electronic device that generates IMU tracking data based on measurement signals received from one or more of the position sensors 425. A position sensor 425 generates one or more measurement signals in response to motion of the near-eye-display 405. Examples of position sensors 425 include: one or more accelerometers, one or more gyroscopes, one or more magnetometers, another suitable type of sensor that detects motion, a type of sensor used for error correction of the IMU 430, or some combination thereof. The position sensors 425 may be located external to the IMU 430, internal to the IMU 430, or some combination thereof.

Based on the one or more measurement signals from one or more position sensors 425, the IMU 430 generates IMU tracking data indicating an estimated position of the near-eye-display 405 relative to an initial position of the near-eye-display 405. For example, the position sensors 425 include multiple accelerometers to measure translational motion (forward/back, up/down, left/right) and multiple gyroscopes to measure rotational motion (e.g., pitch, yaw, and roll). In some embodiments, the IMU 430 rapidly samples the measurement signals and calculates the estimated position of the near-eye-display 405 from the sampled data. For example, the IMU 430 integrates the measurement signals received from the accelerometers over time to estimate a velocity vector and integrates the velocity vector over time to determine an estimated position of a reference point on the near-eye-display 405. Alternatively, the IMU 430 provides the sampled measurement signals to the console 410, which determines the IMU tracking data. The reference point is a point that may be used to describe the position of the near-eye-display 405. While the reference point may generally be defined as a point in space; however, in practice the reference point is defined as a point within the near-eye-display 405 (e.g., a center of the IMU 430).

The IMU 430 receives one or more calibration parameters from the console 410. As further discussed below, the one or more calibration parameters are used to maintain tracking of the near-eye-display 405. Based on a received calibration parameter, the IMU 430 may adjust one or more IMU parameters (e.g., sample rate). In some embodiments, certain calibration parameters cause the IMU 430 to update an initial position of the reference point so it corresponds to a next calibrated position of the reference point. Updating the initial position of the reference point at the next calibrated position of the reference point helps reduce accumulated error associated with the determined estimated position. The accumulated error, also referred to as drift error, causes the estimated position of the reference point to "drift" away from the actual position of the reference point over time.

The imaging device 435 generates image tracking data in accordance with calibration parameters received from the console 410. Image tracking data includes one or more images showing observed positions of the locators 420 that are detectable by the imaging device 435. The imaging device 435 may include one or more cameras, one or more video cameras, any other device capable of capturing images including one or more of the locators 420, or some combination thereof. Additionally, the imaging device 435 may include one or more hardware and software filters (e.g., used to increase signal to noise ratio). The imaging device 435 is configured to detect light emitted or reflected from locators 420 in a field of view of the imaging device 435. In embodiments where the locators 420 include passive elements (e.g., a retroreflector), the imaging device 435 may include a light source that illuminates some or all of the locators 420, which retro-reflect the light towards the light source in the imaging device 435. Image tracking data is communicated from the imaging device 435 to the console 410, and the imaging device 435 receives one or more calibration parameters from the console 410 to adjust one or more imaging parameters (e.g., focal length, focus, frame rate, ISO, sensor temperature, shutter speed, aperture, etc.).

The input interface 440 is a device that allows a user to send action requests to the console 410. An action request is a request to perform a particular action. For example, an action request may be to start or end an application or to perform a particular action within the application. The input interface 440 may include one or more input devices. Example input devices include: a keyboard, a mouse, a game controller, or any other suitable device for receiving action requests and communicating the received action requests to the console 410. An action request received by the input interface 440 is communicated to the console 410, which performs an action corresponding to the action request. In some embodiments, the input interface 440 may provide haptic feedback to the user in accordance with instructions received from the console 410. For example, haptic feedback is provided if an action request is received, or the console 410 communicates instructions to the input interface 440 causing the input interface 440 to generate haptic feedback if the console 410 performs an action.

The console 410 provides content to the near-eye-display 405 for presentation to the user in accordance with information received from one or more of: the imaging device 435, the near-eye-display 405, the input interface 440, and the eye tracker 240. In the example shown in FIG. 4, the console 410 includes an application store 445 and a tracking module 450. Some embodiments of the console 410 have different modules than those described herein. Similarly, the functions further described below may be distributed among components of the console 410 in a different manner than is described herein.

The application store 445 stores one or more applications for execution by the console 410. An application is a group of instructions, that when executed by a processor, generates content for presentation to the user. Content generated by an application may be in response to inputs received from the user via movement of the near-eye-display 405, the input interface 440, or the eye tracker 240. Examples of applications include: gaming applications, conferencing applications, video playback application, or other suitable applications.

The tracking module 450 calibrates the system 400 using one or more calibration parameters and may adjust one or more calibration parameters to reduce error in determination of the position of the near-eye-display 405. For example, the tracking module 450 adjusts the focus of the imaging device 435 to obtain a more accurate position for observed locators on the near-eye-display 405. Moreover, calibration performed by the tracking module 450 also accounts for information received from the IMU 430. Additionally, if tracking of the near-eye-display 405 is lost (e.g., the imaging device 435 loses line of sight of at least a threshold number of the locators 420), the tracking module 450 re-calibrates some or all of the system 400.

The tracking module 450 tracks movements of the near-eye-display 405 using image tracking information from the imaging device 435. The tracking module 450 determines positions of a reference point of the near-eye-display 405 using observed locators from the image tracking information and a model of the near-eye-display 405. The tracking module 450 also determines positions of a reference point of the HMD 405 using position information from the IMU tracking information. Additionally, in some embodiments, the tracking module 450 may use portions of the IMU tracking information, the image tracking information, or some combination thereof, to predict a future location of the near-eye-display 405. The tracking module 450 provides the estimated or predicted future position of the near-eye-display 405 to the engine 355.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:
1. An eyewear device comprising:
an optical element having a front surface, a back surface, a rim along an outer edge of the optical element, and an angled portion of the rim that is angled relative to the front surface and the back surface;

one or more sources that emit light in a first band of light, the one or more sources configured to illuminate a portion of an eye of a user of the eyewear device;

a dichroic mirror that is arranged parallel to the angled portion of the rim and abuts the angled portion of the rim, the dichroic mirror positioned off-axis from an axis that passes through the optical element to the eye, and the dichroic mirror is reflective in the first band of light, is transmissive in a second band of light, and is configured to direct light in the first band that is reflected from the portion of the eye toward a first position; and a camera located in the first position and the first position is located in a plane of the optical element, the camera configured to capture one or more images of the light in the first band reflected by the dichroic mirror.

2. The eyewear device of claim 1, further comprising:
a collimator positioned between the dichroic mirror and the camera, the collimator configured to collimate the light in the first band reflected by the dichroic mirror and direct the collimated light toward the camera.

3. The eyewear device of claim 1, wherein the first band of light comprises frequencies of light in an infrared band, and the second band of light comprises frequencies of light in a visible band.

4. The eyewear device of claim 1, wherein the optical element comprises at least one of:
a waveguide display;
a corrective lens; and
a lens configured to filter ultraviolet light.

5. The eyewear device of claim 4, wherein the waveguide display includes a single waveguide.

6. The eyewear device of claim 4, wherein the waveguide display is polychromatic and includes a stacked array of monochromatic waveguides that are each associated with a different band of light.

7. The eyewear device of claim 1, further comprising a controller configured to:
receive the one or more captured images; and
analyze the one or more captured images to determine eye tracking information of the user of the eyewear device.

8. The eyewear device of claim 1, wherein a first angle is formed between the angled portion of the rim and the back surface, and a second angle, smaller than the first angle, is formed between the angled portion of the rim and the front surface.

9. The eyewear device of claim 1, wherein the dichroic mirror is a concave mirror.

10. The eyewear device of claim 1, wherein the camera is positioned such that the camera is out of a line of sight of the user.

11. An eyewear device comprising:
a frame;
a waveguide display inset into the frame and configured to present content to a user of the eyewear device, the waveguide display having a front surface, a back surface, a rim along an outer edge of the optical element, and an angled portion of the rim that is angled relative to the front surface and the back surface;
one or more sources that emit light in a first band of light, the one or more sources configured to illuminate a portion of an eye of the user of the eyewear device;
a dichroic mirror that is arranged parallel to the angled portion of the rim and abuts the angled portion of the rim, the dichroic mirror positioned off-axis from an axis that passes through the optical element to the eye, and the dichroic mirror is reflective in the first band of light, is transmissive in a second band of light, and is configured to direct light in the first band that is reflected from the portion of the eye toward a first position;
a camera located in the first position and the first position is located in a plane of the optical element, the camera configured to capture one or more images of the light in the first band reflected by the dichroic mirror.

12. The eyewear device of claim 11, further comprising:
a collimator positioned between the dichroic mirror and the camera, the collimator configured to collimate the light in the first band reflected by the dichroic mirror and direct the collimated light toward the camera.

13. The eyewear device of claim 11, wherein the first band of light comprises frequencies of light in an infrared band, and the second band of light comprises frequencies of light in a visible band.

14. The eyewear device of claim 11, wherein the waveguide display is monochromatic and includes a single waveguide.

15. The eyewear device of claim 11, wherein the waveguide display is polychromatic and includes a stacked array of monochromatic waveguides that are each associated with a different band of light.

16. The eyewear device of claim 11, further comprising a controller configured to:
receive the one or more captured images; and
analyze the one or more captured images to determine eye tracking information of the user of the eyewear device.

17. An eyewear device comprising:
an optical element having a front surface, a back surface, a rim along an outer edge of the optical element, and an angled portion of the rim that is angled relative to the front surface and the back surface;
a dichroic mirror that is arranged parallel to the angled portion of the rim and abuts the angled portion of the rim, the dichroic mirror positioned off-axis from an axis that passes through the optical element to the eye, and the dichroic mirror is reflective in a first band of light, is transmissive in a second band of light, and is configured to direct light in the first band that is reflected from a portion of an eye of a user of the eyewear device toward a first position; and
a camera located in the first position and the first position is located in a plane of the optical element, the camera configured to capture one or more images of light in the first band reflected by the dichroic mirror.

18. The eyewear device of claim 17, wherein the light in the first band that is reflected from the portion of the eye is emitted by a light source that is external to the eyewear device.

19. The eyewear device of claim 17, wherein the dichroic mirror is a concave mirror.

20. The eyewear device of claim 17, further comprising a controller configured to:
receive the one or more captured images; and
analyze the one or more captured images to determine eye tracking information of the user of the eyewear device.

* * * * *